United States Patent [19]

Tashiro et al.

[11] Patent Number: 4,768,796
[45] Date of Patent: Sep. 6, 1988

[54] REAR WHEEL DRIVE VEHICLE

[75] Inventors: Yutaka Tashiro; Osamu Yamamoto, Utsunomiya, both of Japan

[73] Assignee: Honda Giken Kogyo Kabushiki Kaisha, Tokyo, Japan

[21] Appl. No.: 60,547

[22] Filed: Jun. 11, 1987

[30] Foreign Application Priority Data

Jun. 13, 1986 [JP] Japan .................... 61-136135

[51] Int. Cl.⁴ .............................................. B60B 35/00
[52] U.S. Cl. ........................................ 280/91; 180/140; 74/711
[58] Field of Search ................... 280/91; 180/140; 74/711

[56] References Cited

U.S. PATENT DOCUMENTS

| | | | |
|---|---|---|---|
| 2,883,884 | 4/1959 | Norton | 74/711 |
| 4,022,084 | 5/1977 | Pagdin et al. | 192/48.3 |
| 4,462,272 | 7/1984 | Roper | 74/711 |
| 4,516,443 | 5/1985 | Hamano et al. | 74/711 |
| 4,526,063 | 7/1985 | Oster | 74/711 |
| 4,572,316 | 2/1986 | Kanazawa et al. | 280/91 |

FOREIGN PATENT DOCUMENTS 1458927 12/1976 United Kingdom .
2151997A 7/1985 United Kingdom .
2168116A 6/1986 United Kingdom .

Primary Examiner—Kenneth R. Rice
Attorney, Agent, or Firm—Armstrong, Nikaido, Marmelstein & Kubovcik

[57] ABSTRACT

A rear wheel drive vehicle having a pair of front steering wheels, a pair of rear driving wheels having axles coupled thereto, and a device for sensing the steering of the front wheels and for steering the rear wheels in response thereto. A differential gear apparatus between the axles of the rear wheels, wherein the differential gear apparatus is a differential lock type, including a differential restricting device such that, when steering the front wheels, the rear wheels are steered in the same direction as the front wheels.

4 Claims, 3 Drawing Sheets

1

REAR WHEEL DRIVE VEHICLE

BACKGROUND OF THE INVENTION

1. Field of the Invention

This invention relates to a rear wheel drive vehicle of the type having a pair of front wheels which are steering wheels, a pair of rear wheels which are steerable driving wheels, and a differential gear means coupled between the respective axles of the two rear wheels, the differential gear means including a differential restricting means.

2. Description of the Prior Art

It has been hitherto known, in the above type of vehicle, that the differential gear means is a differential lock type having a differential restricting means, so that when the rear wheel on one side is in a low friction condition such as a muddy condition or the like, the lowering of the driving force of the rear wheel on the other side may be restricted.

In a rear wheel drive vehicle having a differential gear means of a differential lock type including a differential restricting means, if when the vehicle is moving, as shown in FIG. 1a, an external force Fx caused by a side wind, a roughness of the surface of a road or the like is applied to the vehicle, the vehicle begins to turn clockwise as a result of the moment Mx about the center of gravity M of the vehicle. The rear wheel situated on the inside of the turning direction has a differential restricting torque F1 applied thereto, due to a difference in turning speed between the inside rear wheel and the rear wheel situated on the outside thereof, that is a result of the differential restricting means. Thus, the moment M1 of the differential restricting torque F1 is multiplied by a distance $l_R$ measured from the center of gravity M to the line of the driving force of the rear wheel on the inside, and is applied counterclockwise about the center of gravity M of the vehicle. Accordingly, this moment M1 acts to cancel the moment Mx which is caused by the external force Fx which turns the vehicle clockwise, thereby obtaining the advantage of an improvement in the straight running stability of the vehicle against external disturbances. In this case, the larger the differential restricting torque caused by the differential restricting means, the larger the straight running stability.

When steering of the vehicle, however, as shown in FIG. 1b, the rear wheel on the inside of the turning direction has a restricting torque applied thereto which is almost the same differential restricting torque F1 as above, and a moment M1 about the center of gravity M of the vehicle, caused by this differential restricting torque F1, acts on the vehicle in a direction which is opposite to the steering or turning direction of the vehicle. The torque is caused by the cornering force of the front wheels, and results in a comparatively strong under steering.

Additionally, when steering the vehicle, if the rear wheel on the inside of the steering direction slips, as shown in FIG. 1c, the rear wheel on the outside of the steering or turning direction has the differential restricting torque F1 applied thereto, due to a difference between the turning speed thereof and that of the rear wheel on the inside thereof. This is a result of the action of the differential restricting means. A moment M1 about the center of gravity M of the vehicle caused by the differential restricting torque F1, acts on the vehicle in the same direction as the steering or turning direction of the vehicle caused by the cornering force on the front wheels, so that there is a resulting comparatively strong over steering.

This tendency is increased with an increase in the differential restricting torque of the differential restricting means. Consequently, it becomes difficult to obtain both straight running stability and steering stability.

SUMMARY OF THE INVENTION

This invention has for its object to provide a rear wheel drive vehicle adapted to solve the above-described problems of understeering and oversteering.

The present invention is directed to a vehicle having a pair of front steering wheels, a pair of rear steerable driving wheels having axles coupled thereto, a sensor for sensing the steering of the front wheels coupled to a servo for steering the rear wheels in response thereto, and a differential gear means coupled between the axles of the two rear wheels. The differential gear means is a differential lock type including a differential limiting means such that, when steering the front wheels, the rear wheels are steered in the same direction as the front wheels.

DETAILED DESCRIPTION OF THE PREFERRED EMBODIMENT

Figure 1A:
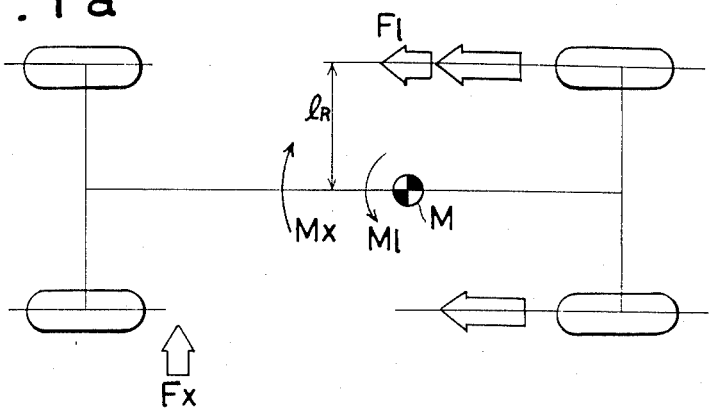
FIGS. 1a, 1b and 1c are diagrams for explaining a conventional apparatus.
Figure 1B:
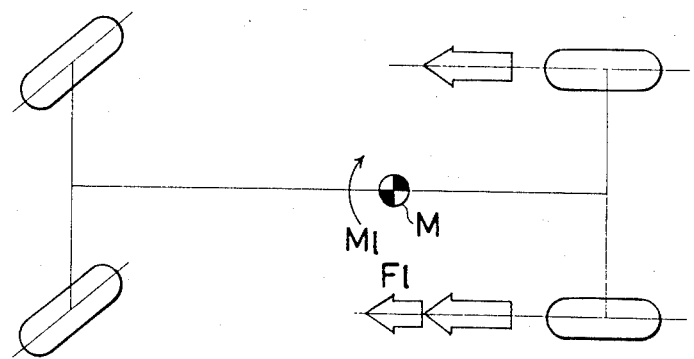
Figure 1C:
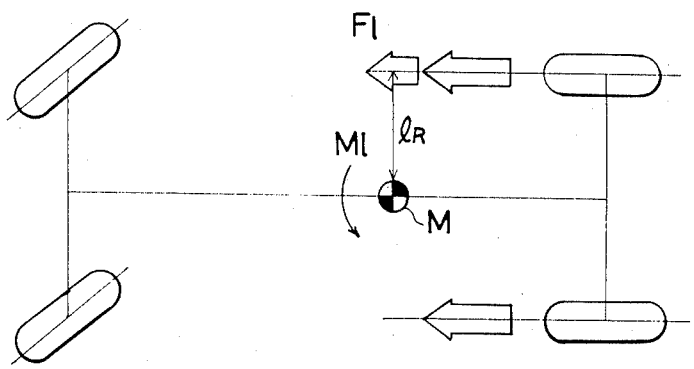
Figure 2:
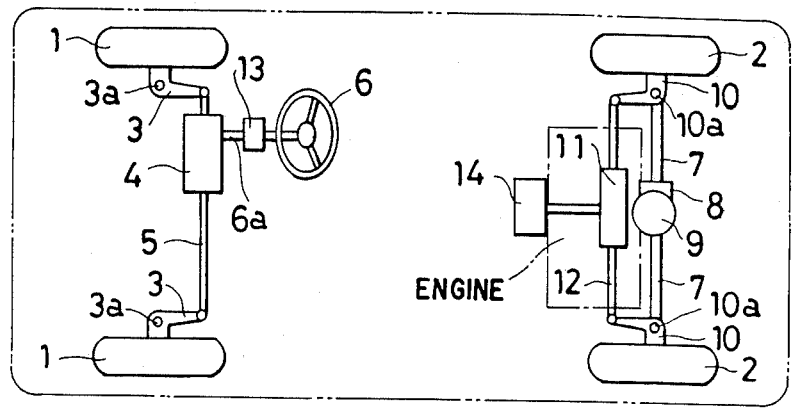
FIG. 2 is a top plan view of one embodiment of the present invention in a rear wheel driven vehicle.

Referring to FIG. 2, a pair of front wheels 1 and a pair of rear wheels 2 are shown. The forward ends of respective knuckle arms 3 of the two front wheels are interconnected through a tie rod 5 extending from a gear box 4 housing a motion converting mechanism such as a rack and pinion mechanism or the like. By moving the tie rod 5 through the turning of a steering wheel 6 connected to the gear box 4, the two front wheels 1 may be steered in either direction through pivotal movement of the respective knuckle arms 3 about pivot shafts 3a.

Additionally, a differential gear means 9 which is a differential lock type, having a differential restricting means 8 coupled thereto is disposed between the axles 7 of the two rear wheels 2 so that power from an engine (not shown) may be transmitted through a transmission to the differential gear means 9 for driving the two rear wheels 2.

The differential restricting means 8 is a torque proportional type wherein the differential restricting torque is increased in accordance with an increase in a difference in rotational speed between the two rear wheels 2. The differential restricting means 8 may, for example, be a frictional clutch type having a cam mechanism, a viscous coupling type, or the like, such as disclosed in U.S. Pat. No. 4,462,272, U.S. Pat. No. 4,516,443, U.S. Pat. No. 4,526,063, U.S. Pat. No. 2,883,884 and U.S. Pat. No. 4,022,084.

The rear wheel 2 on each side is steerable about a pivot shaft 10a of a knuckle arm 10, and the forward ends of the knuckle arms 10 are interconnected through tie rods 12 extending from a gear box 11 housing a motion converting mechanism such as a rack and pinion mechanism or the like. A signal from a detector 13, connected to a steering shaft 6a of the steering wheel 6, may be inputted to a computer (now shown) and a servo-actuator 14 connected to the gear box 11 is operated by an output from the computer so that the movement of the tie rods 12 by the actuator 14, at the time of steering of the two front wheels 1, steers the two rear wheels 2 in the same direction as the front wheels.

A type of rear wheel drive vehicle wherein the two rear wheels are steerable in the same direction as the front wheels is known in the prior art. However, there has not existed in the prior art an arrangement wherein a rear wheel drive vehicle of the type in which the differential gear means 9 thereof is a differential lock type having a differential restricting means 8, and wherein the rear wheels 2 are steered in the same direction as the front wheels 1. This feature is the characteristic feature of the present invention.

Next, the operation of this invention vehicle will be explained as follows:

When steering the front wheels 1, of the vehicle, the rear wheels 2 are steered in the same direction as the steering direction of the front wheels 1. Thus, when steering the vehicle, the steering angle of the front wheels becomes smaller as compared to a vehicle of the type where only the front wheels thereof are steered. Accordingly, as shown in FIG. 3a, when a vehicle with the present invention is turned along on a curved line Y about a point X, the steering center is a point 0 which is displaced from a point 0' which is the steering center of a vehicle of a type in which only the front wheels thereof are steered. Thus, the steering radius using the present invention, becomes larger and the difference in rotational speed between the two rear wheels 2 thereof becomes smaller. Consequently, a restricting torque acting on the rear wheel 2 on the inside of the steering direction that is caused by the differential restricting means 8 becomes smaller so that under steering is decreased.

Figure 3B:
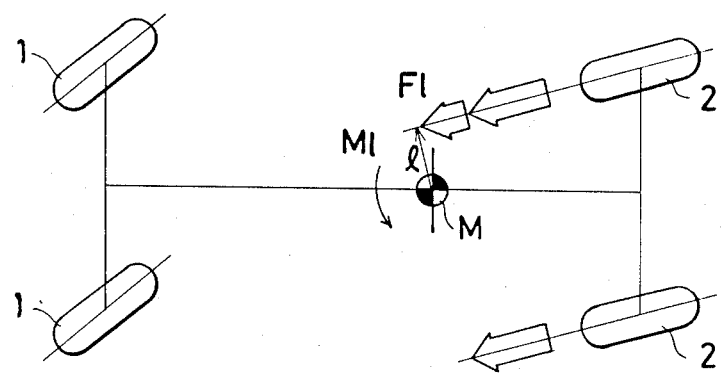
FIGS. 3a and 3b are diagrams for explaining the operation of the embodiment of FIG. 2.
Figure 3A:
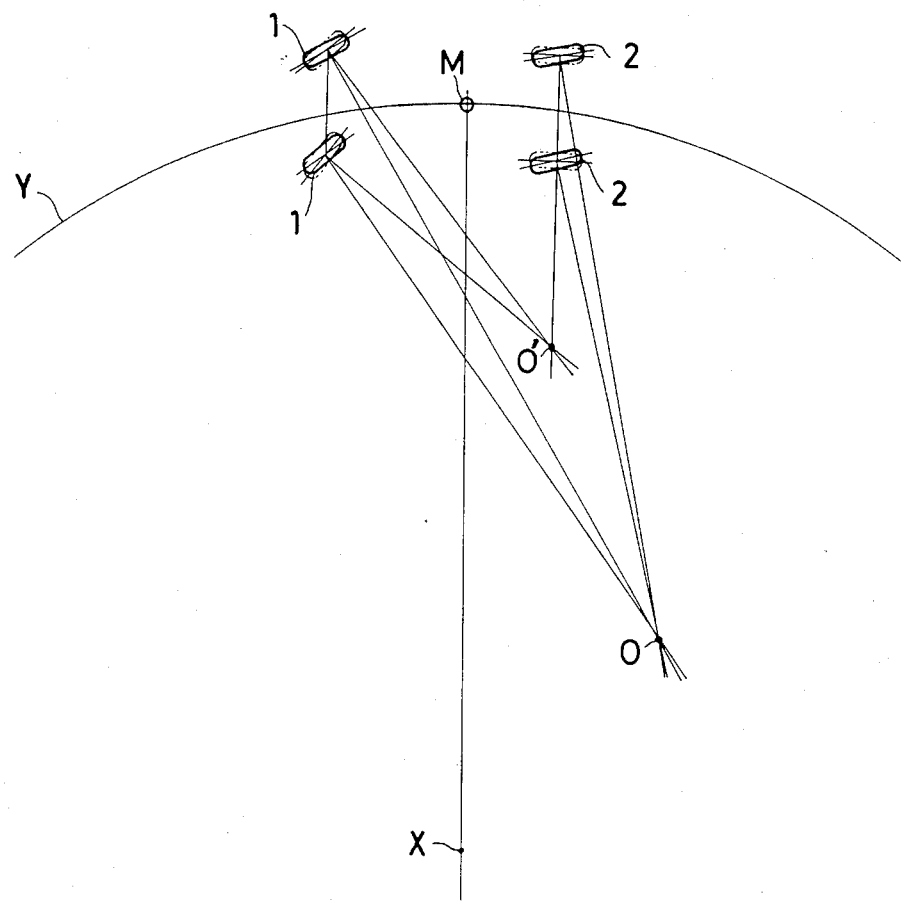

Additionally, when steering of the vehicle with the rear wheel 2 on the inside of the steering direction slipping, as shown in FIG. 3b, the distance l from the center of gravity M to the line of the driving force of the rear wheel 2 on the outside of the turning direction, is smaller than that of a vehicle of the type where only the front wheels are steered. Consequently, even if, due to the action of the differential restricting means 8, the differential restricting torque F1 is applied to the rear wheel 2 on the outside of the steering direction, because of a difference in the turning speed between the rear wheel 2 on the outside and the rear wheel 2 on the inside, the moment M1 in the same direction as the turning direction of the vehicle about the center of gravity M of the vehicle becomes smaller, so that over steering is decreased.

Consequently, even if the differential restricting torque of the differential restricting means 8 is set to be comparatively large, the running stability during steering of the vehicle will not be substantially decreased, and accordingly, the differential gear means 9 can include the differential restricting means 8 which is set to a large differential restricting torque. Thus, the straight running characteristic is improved in situations involving external disturbances such as side winds or the like.

In a FR vehicle, that is, an rear wheel drive vehicle having an engine mounted on a front part thereof, the inertial moment about the center of gravity is comparatively large, because the distance from the center of gravity to the engine is comparatively large, and accordingly, a large torque is needed for causing yawing. Thus, the straight running characteristic opposing an external disturbance such as a side wind or the like is not substantially decreased. However, in an MR vehicle, that is, a rear wheel drive vehicle having an engine mounted between the front wheel axle and the rear wheel axle, a yaw motion is generated by a comparatively small torque, because the engine is located near the center of gravity of the vehicle, and the straight running characteristic opposing an external disturbance such as a side wind or the like is apt to be decreased. Accordingly, the present invention is most effective when used in an MR vehicle.

Thus, according to this invention, even if the differential restricting torque of the differential restricting means is large, the steering stability of the vehicle is not significantly decreased and both the straight running stability and the steering stability are improved.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A rear wheel drive vehicle, comprising:
   a pair of front steering wheels;
   a pair of rear driving wheels having axles coupled thereto;
   means for sensing the steering angle of said front wheels and for steering said rear wheels in response thereto; and
   a differential gear means between said axles of said rear wheels, wherein the differential gear means is a differential lock type gear means including a differential restricting means such that, when steering said front wheels, the rear wheels are steered in the same direction as said front wheels, and the steering angle of the rear wheels is smaller than that of the front wheels.

2. A rear wheel drive vehicle as claimed in claim 1, wherein the vehicle is a mid-engine rear wheel drive vehicle.

3. A rear wheel drive vehicle as claimed in claim 1, wherein said means for sensing the steering of said front wheels and steering said rear wheels comprises detector means for detecting the turning of the steering wheels and servo means coupled to said detector means for providing an output as a function of the output of said detector means, said servo means being coupled to said rear wheels for steering said rear wheels in accordance with the output thereof.

4. A rear wheel drive vehicle, comprising:
   a pair of front steering wheels;
   a pair of rear driving wheels having axles coupled thereto;
   means for sensing the steering angle of said front wheels and for steering said rear wheels in response thereto; and
   a differential gear means between said axles of said rear wheels, wherein the differential gear means is a limited slip differential means, such that, when steering said front wheels, the rear wheels are steered in the same direction as said front wheels, and steering angle of the rear wheels is smaller than that of the front wheels.

* * * * *